United States Patent
Huang et al.

(10) Patent No.: US 6,877,409 B2
(45) Date of Patent: Apr. 12, 2005

(54) CUTTING APPARATUS AND METHOD FOR VENETIAN BLINDS

(75) Inventors: Chin-Tien Huang, Taipei Heien (TW); Fu-Lai Yu, Taipei Heien (TW)

(73) Assignee: Teh Yor Industrial Co., Ltd., Taipei (TW)

( * ) Notice: Subject to any disclaimer, the term of this patent is extended or adjusted under 35 U.S.C. 154(b) by 273 days.

(21) Appl. No.: 09/976,553

(22) Filed: Oct. 12, 2001

(65) Prior Publication Data
US 2003/0070515 A1 Apr. 17, 2003

(51) Int. Cl.⁷ .............................. B23D 23/00; B26D 1/38
(52) U.S. Cl. .............................. 83/52; 83/199; 83/622; 83/694
(58) Field of Search .................. 83/513, 519, 621, 83/622, 604, 694, 452, 197, 52, 659, 199–200, 196; 29/24.5

(56) References Cited

U.S. PATENT DOCUMENTS

| 146,846 | A | * | 1/1874 | Stevens ........................ 83/200 |
| 690,083 | A | * | 12/1901 | Stolpe ......................... 83/199 |
| 924,251 | A | * | 6/1909 | Liebig et al. ................. 83/199 |
| 2,428,650 | A | * | 10/1947 | Brunner ....................... 83/199 |
| 3,584,529 | A | | 6/1971 | Wallace ....................... 83/457 |
| 4,819,530 | A | | 4/1989 | Huang .......................... 83/39 |
| 5,103,702 | A | | 4/1992 | Yannazzone .................. 83/29 |
| 5,170,689 | A | * | 12/1992 | Dvorak ........................ 83/197 |
| 5,339,716 | A | | 8/1994 | Sands et al. ................. 83/452 |
| 5,799,557 | A | * | 9/1998 | Wang ........................ 83/639.5 |
| 5,806,394 | A | | 9/1998 | Marocco ....................... 83/197 |
| 5,816,126 | A | * | 10/1998 | Pluber ......................... 83/167 |
| 5,927,172 | A | * | 7/1999 | Wang ........................... 83/454 |
| 6,058,820 | A | * | 5/2000 | Rinner ......................... 83/200 |
| 6,079,306 | A | * | 6/2000 | Liu ............................. 83/454 |
| 6,089,134 | A | | 7/2000 | Marocco ....................... 83/197 |
| 6,167,789 | B1 | * | 1/2001 | Daniels et al. ................. 83/13 |
| 6,178,857 | B1 | | 1/2001 | Marocco ........................ 83/52 |
| 6,196,099 | B1 | | 3/2001 | Marocco ....................... 83/197 |
| 6,240,824 | B1 | * | 6/2001 | Hsu ............................ 83/622 |
| 6,334,379 | B1 | * | 1/2002 | Sudano ........................ 83/452 |
| 6,336,388 | B1 | * | 1/2002 | Marocco ....................... 83/454 |
| 6,553,878 | B1 | * | 4/2003 | Gosis et al. ................... 83/13 |
| 6,758,120 | B1 | * | 7/2004 | Marocco ........................ 83/52 |
| 2001/0017073 | A1 | * | 8/2001 | Marocco ....................... 83/454 |
| 2001/0054338 | A1 | * | 12/2001 | Marocco ........................ 83/13 |

FOREIGN PATENT DOCUMENTS

CA     2136519     11/1994

* cited by examiner

*Primary Examiner*—Stephen Choi
(74) *Attorney, Agent, or Firm*—Olson & Hierl, Ltd.

(57) ABSTRACT

A cutting machine for a Venetian blind comprising a head rail, a bottom rail, and a plurality of blind slats. The cutting machine comprises a body defining a head rail opening, a bottom rail opening, and at least one blind slat opening, a plate for cutting the head rail, a blade assembly for cutting the bottom rail the blind slats, and a drive mechanism. The drive mechanism is operatively connected to the plate and the blade assembly causing the plate to cut the head rail while, at the same time, causing the blade assembly to cut the bottom rail and the blind slats.

43 Claims, 3 Drawing Sheets

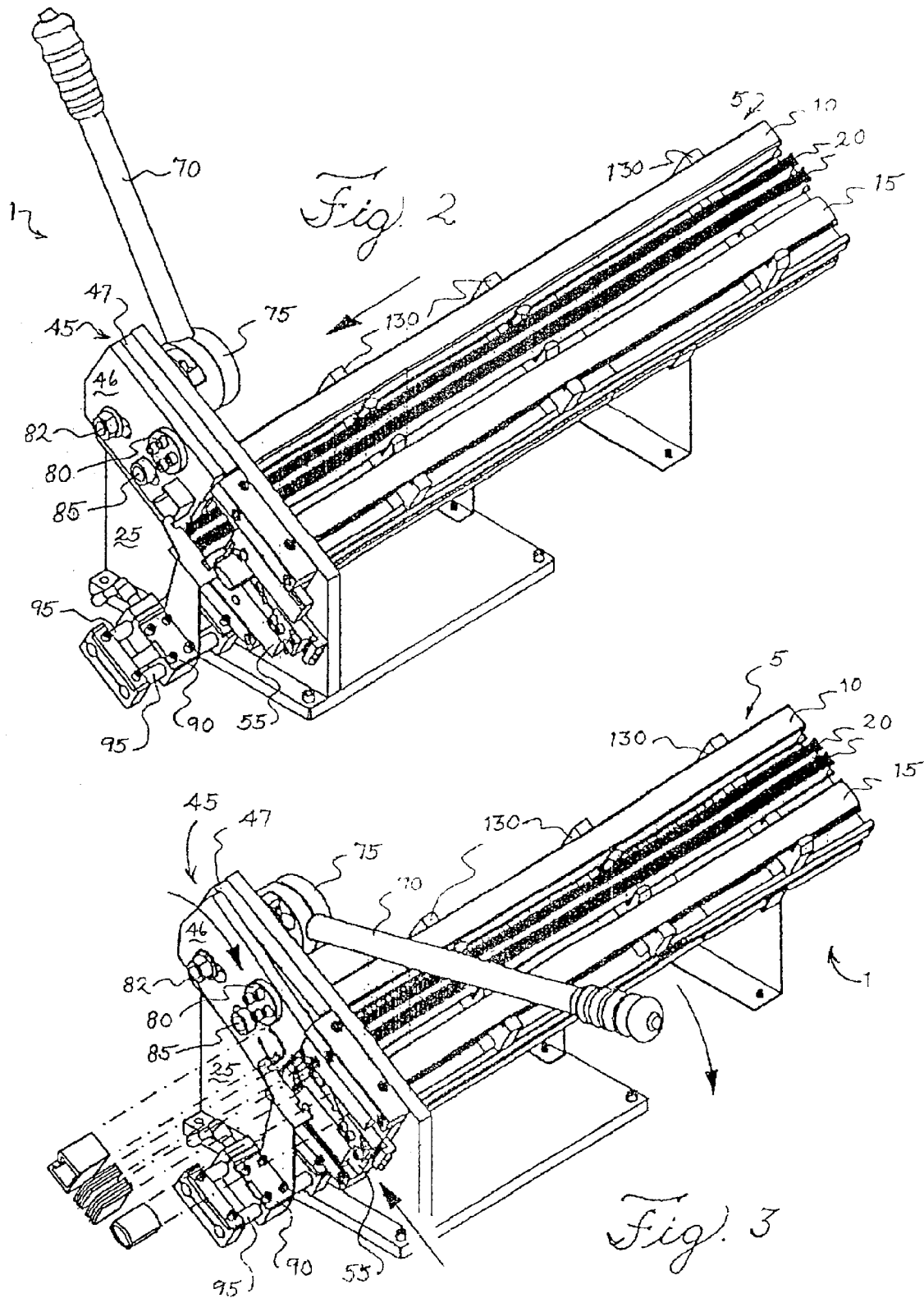

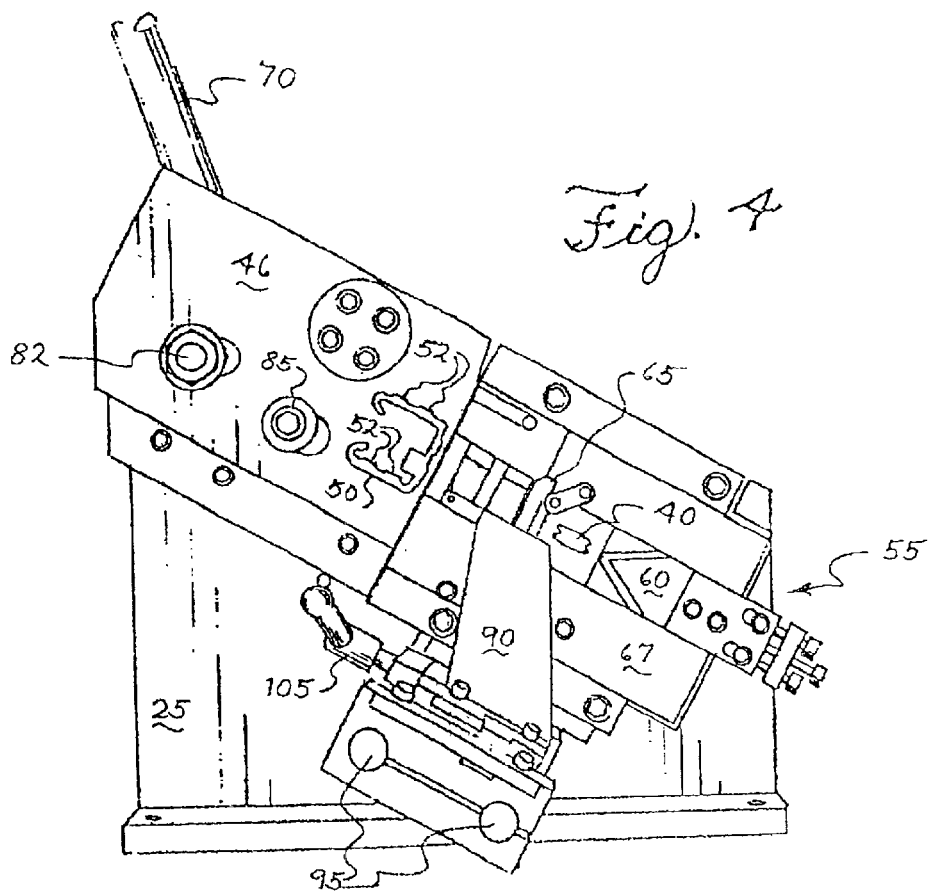
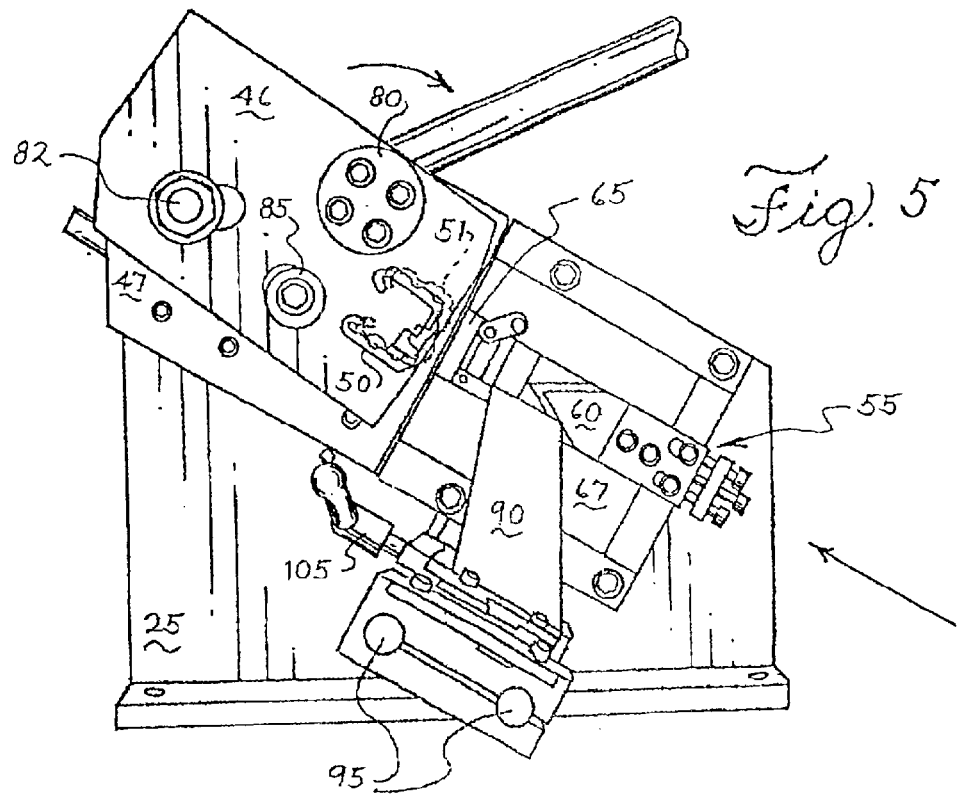

CUTTING APPARATUS AND METHOD FOR VENETIAN BLINDS

FIELD OF INVENTION

This invention relates to a cutting apparatus for Venetian blinds and a method for using the apparatus. In particular, this invention relates to a cutting apparatus that can simultaneously cut the ends of the components of a typical Venetian blind, namely, the head rail, bottom rail and blind slats, in one operation.

BACKGROUND OF INVENTION

Venetian blinds are a well known covering for windows. Venetian blinds typically include a head rail, a bottom rail, and a plurality of blind slats. The head rail is usually made from a relatively strong and rigid metal, whereas the bottom rail and blind slats are made from thinner pieces of aluminum. Each of these blind components are designed to extend horizontally across a window space.

Window spaces, however, are built in a myriad of different widths. Therefore, there is a need for many different widths of Venetian blinds to suit the differing widths of window spaces. For many years it has been the practice to manufacture Venetian blinds on a custom basis. Each blind would be made with the width of the blind components to correspond to the width of the particular window for a particular customer. This procedure is relatively expensive because the process lacks any economies of scale. This custom process also requires a substantial amount of time to custom build blinds for each particular window.

In order to remedy this problem, various manufacturers have produced Venetian blind cutting machines that can trim Venetian blinds of various standard sizes to the desired width at the point of sale. With such machines, a customer wishing to purchase blinds from such an outlet would simply come in with the measurements of his or her windows, and select blinds from a stock of standard size blinds, which are slightly wider than the desired measurement. The retail store would then trim the ends of the blinds to the widths desired.

One example of this type of machine is the apparatus disclosed in Canadian Patent Application No. 2,136,519. The apparatus described in Canadian Patent Application No. 2,136,519 provides a blind cutting apparatus that uses a guillotine-type blade or shear to cut the head rail, and a second blade assembly to cut the bottom rail and blind slats. The Venetian blind components are passed through openings in a body until the components contact an adjustable end guide. The cutters for the head rail, the bottom rail and blind slats are juxtaposed to the body, and are all connected to a drive which, when actuated, causes the cutter for the head rail, and the cutter for the bottom rail and blind slats, to move along linear or straight paths to cut the Venetian blind components.

One shortcoming of the device disclosed in Canadian Patent Application No. 2,136,519 is the amount of force needed to cut the blind components. As stated, the head rail in a Venetian blind is typically made of a fairly strong metal that is difficult to cut. Since the apparatus of Canadian application No. 2,136,519 is configured to cut along a straight path, a substantial amount of force is required to complete the trimming operation. To supply the required force, the device shown is driven by a hydraulic mechanism. Such a power driven system increases the size and complexity of such a machine, as well as increases the expense of the machine. Also, because a blade is used, operators may experience substantial down time due to the need to change blades when worn out.

Another blind cutting apparatus is disclosed in U.S. Pat. Nos. 5,806,394; 6,178,857; and 6,196,099. Each of these patents discloses a cutting apparatus for Venetian blinds that, instead of a guillotine-type blade, uses a die plate to cut the head rail. The die plate is described as cutting the head rail linearly or along a straight path, preferably on a diagonal axis. In order to lessen the amount of force required by the operation to cut the blind components at any one time during the cutting process, these patents explain that the cutting of the head rail takes place in one part of the operation, and the cutting of the bottom rail and blind slats takes place in another. In other words, the cutting of the head rail and the cutting of the bottom rail and slat are performed at different times. Specifically, these patents describe a drive mechanism that, during the first part of the cutting stroke cuts the head rail, and during a second part of the cutting stroke cuts the bottom rail and blind slats. In order to accomplish this two part operation, the drive mechanism uses a complex slip pin and transmission is used to engage the die plate first, and then a blade assembly. While such an arrangement lessens the amount of force exerted during the cutting operation by limiting the number of blind components cut at any one time, additional parts are required to separate the cutting operations, which is inherently more expensive, and prone to breakdowns. Furthermore, since the cutting does not occur at the same time, there is a heightened potential for one or more of the blind components to shift during the cutting process, and therefore, result in an uneven cut.

Other prior art devices are also limited in the type of bottom rails which can easily be cut. While they can cut open or C-shaped bottom rails, they have difficulty cutting bottom rails which are closed, i.e., not having an opening.

What is needed is an apparatus that accurately and efficiently trims Venetian blinds in a simple machine, and that reduces the required amount of force required to complete the cutting operation. The present invention meets these desires and overcomes the shortcomings of the prior art.

SUMMARY OF THE INVENTION

The present invention is an apparatus for cutting a Venetian blind and a method for operating the apparatus. Typically such Venetian blinds comprise a head rail, a bottom rail, and a plurality of blind slats. The present invention enables an operator to cut all these components in a single stage operation without undue force being required to be exerted by the user.

The blind cutting apparatus includes a body, which defines a head rail opening, at least one blind slats opening, and a bottom rail opening. The blind cutting apparatus further comprises a die for cutting the head rail. The die includes two plates located in a co-planar relationship adjacent to each other, each having a head rail aperture, through which an end of the head rail is passed. The die is located next to the body and at least one of the die plates is rotatable. After an end of a head rail is passed through the body opening and the two head rail apertures, at least one of the plates of the die may be rotated by a drive mechanism such that the rotation causes a shearing action between the two plates thereby cutting the head rail. In a preferred embodiment, the head rail aperture on one of the plates may include tooth-like projections, which assist in cutting the head rail by piercing the head rail, and further lessen the amount of force required.

The blind cutting apparatus also includes a blade assembly, also located next to the body, for cutting the bottom rail and the blind slats. The bottom rail and blind slats are cut by the blade assembly. In particular, the ends of the bottom rail and blind slats are passed through bottom rail and blind slats openings in the body. The blade assembly, which is operatively connected to the drive, is moved along a straight or linear path to intersect and cut off the ends of the bottom rail and blind slats extending through their respective openings in the body. The blade assembly preferably includes at least one guillotine-type blade, but may include more than one blade for cutting the bottom rail and blind slats. The blade assembly of the present invention may also be easily interchanged to accommodate different sizes and shapes of bottom rails. For example, bottom rails often comprise a profile having a shape that has an opening, such as a C-shaped profile or a rectangular profile with a segment of one side of the rectangle removed. Other bottom rails, are shaped having a profile with no opening, such as an oval, rectangle, circle, or various other closed shapes. Depending on the bottom rail to be cut, the different blades or dies for the blade assembly of the present invention can be easily installed and used. The blade assembly and die plates are each driven by the drive mechanism such that the bottom rail and blind slats are cut by the blade assembly at substantially the same time as the cutting of the head rail by the die plates.

Because at least one of the plates of the die is designed to move in a rotational manner to cut the head rail, less force is required to cut the head rail than if a die plate were moved along a linear path. Since less force is required to cut the head rail, the bottom rail and blind slats may be trimmed concurrently with the head rail, without any part of the operation requiring an undue amount of force to be exerted by the user.

The present invention may also include an end guide. This end guide is located adjacent to the blade assembly and is configured to restrict how far the blind components can be passed through their respective openings in the body. In this way, a user of the present invention can accurately measure the amount of the blind components to be trimmed and ensure that the desired amount is cut. In some embodiments, this end guide may be caused to move during the cutting operation such that as the blind components are being cut, the end guide may be moved clear of the components so that the cut pieces may be more easily removed from the machine.

Operation of the present invention should be apparent from the previous discussion; however, the following briefly explains the process of cutting a Venetian blind with the present invention. A user of the machine will first determine the total amount of the Venetian blind he or she wishes to be trimmed. The user then adjusts the end guide to correspond to one-half of the total amount to be trimmed. One end of the head rail, bottom rail, and blind slats are then inserted into and through their respective openings in the body. The head rail is also passed through the head rail apertures in the plates. The blind components are extended through their respective opening until they contact the end guide. A blind slats clamp may then be engaged to assist in holding the blind slats in place. The user then pulls a lever which causes a die plate to rotate, and causes the blade assembly to move. The movement of the blade assembly cuts the bottom rail and blind slats, while the rotation of the plate cuts the head rail. The trimming of these components all takes place at the same time. The pulling of the lever may also cause a pair of end guide pistons, which are operatively connected to the drive mechanism, to move and shuttle the end guide away from the cut blind pieces for easier removal. The operator then returns the lever to the start position and cuts the other side of the blind in the same manner.

As discussed, the present invention uses a rotationally movable die plate to cut the head rail, while concurrently cutting the bottom rail and blind slats with a guillotine type blade. Because all of the Venetian blind components are cut at approximately the same time, there is a time savings. Since all the blind components are cut at the same time, there is little chance for slippage of the components during the trimming process, which would result in uneven cutting.

BRIEF DESCRIPTION OF THE DRAWINGS

In the drawings,

FIG. 2 is a perspective view of an embodiment of a blind cutting apparatus in accordance with the present invention with a Venetian blind;

FIG. 3 is a perspective view of an embodiment of a blind cutting apparatus in accordance with the present invention shown cutting a Venetian blind;

FIG. 4 is a side elevation view of the blind cutting apparatus in a starting position;

FIG. 5 is a side elevation of the blind cutting apparatus showing movement of the die plate and blade assembly.

DESCRIPTION OF PREFERRED EMBODIMENTS

Figure 1:
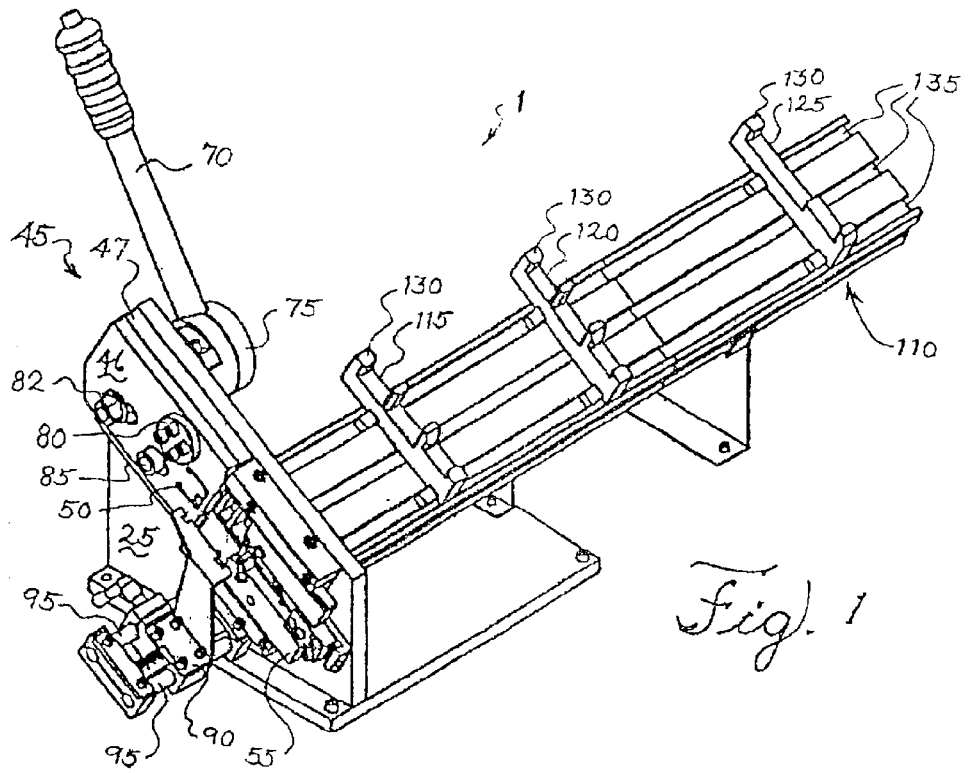
FIG. 1 is a perspective view of an embodiment of a blind cutting apparatus in accordance with the present invention.

The invention disclosed herein is susceptible to embodiment in many different forms. Shown in the drawings and described in detail hereinbelow are certain preferred embodiments of the present invention. The present disclosure, however, is an exemplification of the principles and features of the invention, but does not limit the invention to the illustrated embodiments.

Figure 6:
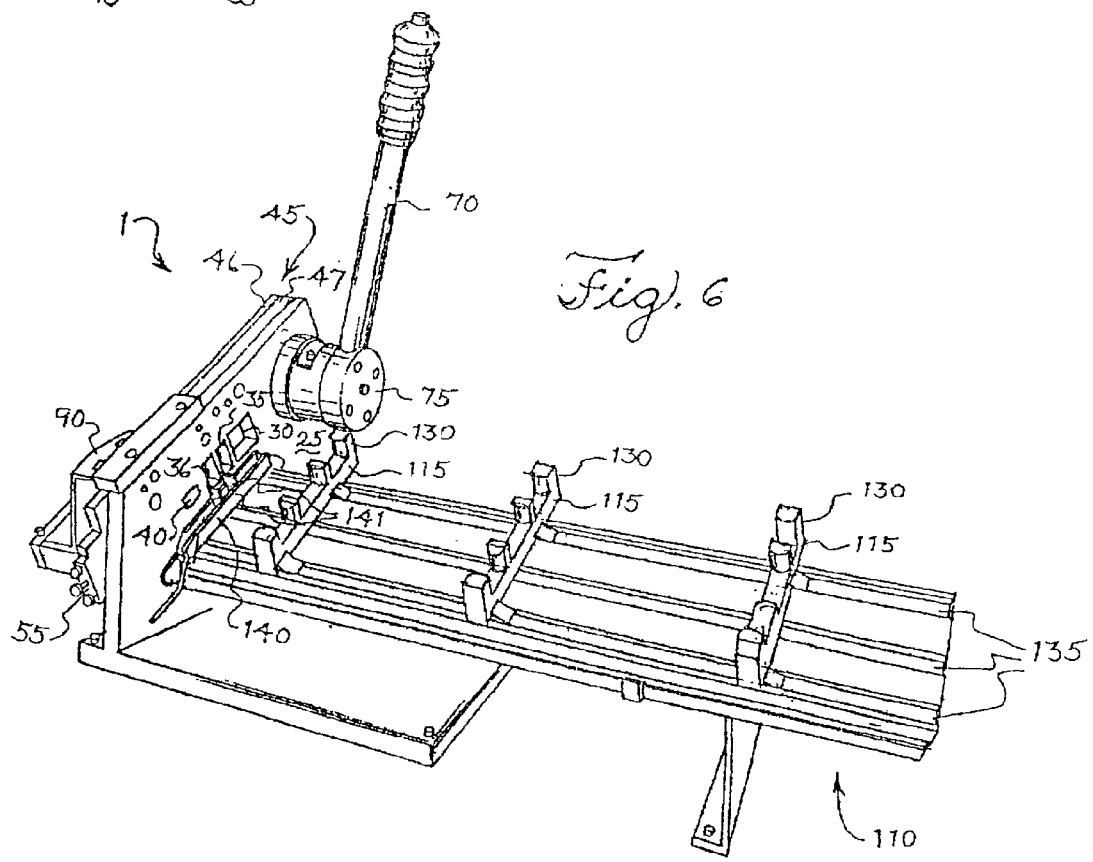
FIG. 6 is a second perspective view of an embodiment of the blind cutting apparatus according to the present invention.

Referring to FIGS. 1 and 2, an embodiment of a Venetian blind cutting apparatus 1 suitable for trimming the components of a Venetian blind 5, such as the head rail 10, the bottom rail 15, and a plurality of blind slats 20 according to the present invention is shown. Also shown in FIGS. 1 and 6 is a body 25 having a head rail opening 30, blind slat openings 35, 36, and a bottom rail opening 40. The bottom rail opening 40 is preferably configured to hold the bottom rail 15 flat so it may be cut along its long cross-sectional axis such as shown in the FIGURES, from front to back.

Located adjacent to the body 25 is a die 45. The die 45 preferably comprises two parallel or co-planar plates 46, 47, that are in rotationally slidable engagement with each other. Plates 46, 47 include head rail apertures 50 and 51 (FIG. 5) respectively. Each of head rail apertures 50, 51 preferably has a profile corresponding to the cross section of the head rail 10, but slightly larger in size so as to allow the head rail 10 to pass through head rail apertures 50 and 51. In a more preferred embodiment, the head rail aperture 50 includes one or more tooth-like projections 52, which provide corner-like edges to pierce the head rail 10, and enable easier cutting of the head rail 10. Also located next to the body 25 is a blade assembly 55 for cutting the bottom rail 15, and the blind slats 20.

Both the blade assembly 55 and plate 46 of die 45 are movable, and are controlled by a drive mechanism. In this embodiment, the drive mechanism is shown as comprising a lever arm 70 connected to a drive axle 75. As the lever arm 70 is pulled by an operator, the drive axle 75 is rotated, as shown in FIGS. 3 and 5. As the drive axle 75 is rotated, the plate 46 is also rotated a sufficient amount to cut the head rail 10. Because the head rail apertures 50, 51 each have profiles that generally correspond to the cross section of the head rail 10, the angular distance that plate 46 needs to travel in order to complete the cutting of the head rail 10 is minimal. As such, the relatively large moment force on the lever arm 70 translated to plate 46 across a minimal angular distance so that the actual force needed to be exerted by the user is minimized. In this preferred embodiment, the plate 46 is caused to rotate by drive spindle 82 about die axis 80, with rotation further guided by guide pin 85.

Drive spindle 82 extends from a drive cog (not shown), which is operatively connected to drive axle 75, such that the drive cog and drive axle 75 rotate together. As the drive cog rotates, drive spindle 82, which is offset from the central axis of the drive cog causes plate 46 to rotate about die axis 80. Although the present invention is described as having only plate 46 being rotatable, it is possible that either or both of plates 46 and 47 may be rotated to cause the shearing action. Alternatively, die 45 may comprise only one plate adjacent to the body 25. In such an embodiment, it is preferred that head rail opening 30 have a profile corresponding to the cross section of the head rail 10 such that the shearing action of the single plate against body 25 accomplishes the cutting of the head rail 10.

Concurrent with the angular movement of the plate 46, the blade assembly 55, which is also operatively connected to drive axle 75, is caused to move linearly to cut the bottom rail 15 and blind slats 20 as described below. In a preferred embodiment, when drive axle 75 is rotated, the drive cog (not shown) is also rotated, which causes blade assembly 55 to move via a rack and pinion gearing (not shown). While the operation of the blind cutting machine 1 shown in this preferred embodiment is powered manually, it should be noted that it is known in the art to use a pneumatic, hydraulic, or other power driven means to operate the blind cutting machine 1. Therefore, it is contemplated that such a power driven drive may be incorporated into the present invention.

In this preferred embodiment, the blade assembly 55 comprises a blade housing 67, the blade housing 67 supporting a first blade 60 for cutting the bottom rail 15, and a second blade 65 for cutting the plurality of blind slats 20. It is possible, however, that the blade assembly 55 may be a die or any other arrangement of blade desired. It is preferred that the first blade 60 for cutting the bottom rail 15 have a generally pointed shape as shown in FIGS. 4 and 5. It is also preferred that the second blade 65 for cutting the plurality of blind slats 20 is flat or slightly curved in the same manner as the blind slats 20 such that an even cut is more easily achieved on the ends of the blind slats which remain visible after the cut is made. In this embodiment, the blade housing 65 causes the first blade 60 and the second blade 65 to move at the same time to cut the bottom rail 15 and the blind slats 20. As shown in the FIGURES, the first blade 60 cuts the bottom rail 15 from front to back across its long cross-sectional axis without collapsing or crushing the bottom rail.

A preferred feature of the present invention is an end guide 90, which is configured to contact the ends of the head rail 10, bottom rail 15, and blind slats 20 once the desired amount of the head rail 10, bottom rail 15, and blind slats 20 has been fed through their respective openings 30, 35, 36, 40 as shown in FIG. 2. As such, the operator of the machine can accurately measure and control the amount of the Venetian blind to be trimmed. The end guide 90 also includes an end guide lock 105, which, when disengaged, allows end guide 90 to be moved by the user along a pair of end guide pistons 95 to a desired position. When end guide lock 105 is engaged, the end guide 90 is secured into the desired position so that the desired length of the head rail 10, bottom rail 15, and blind slats 20 is permitted to extend past the die 45 and blade assembly 55. In a preferred embodiment, the end guide pistons 95 are operatively connected to drive axle 75 such that as drive axle 75 is rotated, end guide pistons 95 cause end guide 90 to move perpendicular to and away from the ends of the head rail 10, bottom rail 15, and blind slats 20. By so doing, the ends of the head rail 10, bottom rail 15, and blind slats 20, when cut, will be easier to remove because end guide 90 will have been moved clear of the ends of the blind components as the components are cut.

As shown in FIGS. 1 and 2, it is preferred that the blind cutting machine 1 include a blind support 110 to hold the end of the Venetian blind 5 that is not being trimmed. In this particular embodiment, the blind support 110 includes three brackets 115, 120, 125. The brackets 115, 120, 125 serve to keep the Venetian blind 5 level. As shown, each of brackets 115, 120, 125 includes bracket guides 130, which may be used to separate the head rail 10, bottom rail 15, and blind slats 20 to inhibit any movement of these Venetian blind components during the cutting process. Brackets 115, 120, 125 are preferably movable along tracks 135 to permit adjustment for different width blinds.

As shown in FIG. 6, before cutting of the Venetian blind 5 is performed, it is also preferred to engage blind slats clamp 140. Blind slats clamp 140 is preferably supported by blind support 110 and includes a pair of fins 141, which, when the blind slats clamp 140 is engaged, will hold blind slats 20 to one side of blind slats openings 35, 36. This serves to further prevent movement of the blind slats 20 during the cutting operation to ensure an even cut.

Operation of the blind cutting apparatus 1 should be apparent from the previous discussion; however, the following briefly explains the process of cutting Venetian blind 5 with the present invention. A user of the machine will first determine the total amount of the Venetian blind 5 he or she wishes to be trimmed. The user then adjusts the end guide 90 to correspond to one-half of the total amount to be trimmed. One end of the head rail 10, bottom rail 15, and blind slats 20 are then inserted into and through their respective openings 30, 35, 36, 40 in the body 25. The head rail 10 is likewise passed through the head rail apertures 50, 51 in the plates. The blind components 10, 15, 20 are extended through until they contact the end guide 90. A blind slats clamp 140 may then be engaged to assist in holding the blind slats 20 in place. The user then pulls lever 70 which causes die plate 46 to rotate, and causes the blade assembly 55 to move. The movement of the blade assembly 55 cuts the bottom rail 15 and blind slats 20, while the rotation of the plate 46 cuts the head rail 10. The trimming of these components all takes place at the same time. The pulling of the lever 70 may also cause a pair of end guide pistons 95, which are operatively connected to the drive mechanism, to move and shuttle the end guide 90 away from the cut blind pieces for easier removal. The operator then returns the lever to the start position and cuts the other side of the blind in the same manner.

Since the relative movement between the plate 46 and plate 47 is arcuate rather than linear, less of the head rail 10 is being cut at any one time. The cutting action is also more of a slicing motion as opposed to a punching motion. Therefore, less force needs to be exerted by the operator on lever arm 70 to cut head rail 10 than would be required with a cut made along a linear path. In a preferred embodiment, the head rail aperture 50 includes tooth-like projections 52 which, in addition to the shearing action, also create a piercing action to cut the head rail 10. This piercing action of the tooth-like projection 52 further lessens the amount of force required.

The foregoing description and the drawings are illustrative of the present invention and are not to be taken as limiting. Still other variants and rearrangements of parts within the spirit and scope of the present invention are possible and will be readily apparent to those skilled in the art.

What is claimed is:

1. An apparatus for cutting a venetian blind comprising a head rail, a bottom rail, and a plurality of blind slats, the apparatus comprising:
   a body defining a head rail opening, at least one blind slats opening, and a bottom rail opening;
   a rotatable plate, the plate comprising a head rail aperture and configured to cut the head rail;
   a linearly movable blade assembly, the blade assembly configured to cut the bottom rail and the plurality of blind slats as the blade assembly is moved linearly;
   a drive mechanism operatively connected to the plate and the blade assembly, whereby the drive mechanism causes the plate to rotate to cut the head rail while also causing the blade assembly to move to cut the bottom rail and plurality of blind slats, such that the head rail, the bottom rail and the blind slats are cut concurrently and non-sequentially.

2. The apparatus of claim 1 wherein the blade assembly comprises a blade housing, the blade housing supporting a first blade for cutting the bottom rail, and a second blade for cutting the plurality of blind slats.

3. The apparatus of claim 2 wherein the first blade is configured to cut a bottom rail having an open profile.

4. The apparatus of claim 2 wherein the first blade is configured to cut a bottom rail having a closed profile.

5. The apparatus of claim 2 wherein the first blade cuts the bottom rail along its long cross-sectional axis.

6. The apparatus of claim 1 wherein the drive mechanism is manually operated.

7. The apparatus of claim 1 further including an adjustable end guide adjacent to the body, whereby the end guide is configured to contact the head rail, bottom rail, and blind slats when a desired length of the head rail, the bottom rail, and the blind slats are passed through the body.

8. The apparatus of claim 7 wherein the end guide further comprises an end guide lock.

9. The apparatus of claim 8 wherein the end guide is operatively connected to the drive such that the end guide is movable to allow cut blind pieces to be removed.

10. The apparatus of claim 1 further comprising a support juxtaposed to the body, wherein the support includes at least one bracket configured to support at least the head rail, the bottom rail and the blind slats.

11. The apparatus of claim 1 further comprising a blind slats clamp.

12. The apparatus of claim 1 wherein the head rail aperture has a profile corresponding to a cross section of the head rail.

13. The apparatus of claim 12 wherein the head rail aperture further comprises tooth-like projections for piercing the head rail.

14. A cutting machine for a venetian blind comprising a head rail, a bottom rail, and a plurality of blind slats, the cutting machine comprising:
   a body defining a head rail opening, a bottom rail opening, and at least one opening for the plurality of blind slats;
   a plate for cutting the head rail, the plate defining a head rail aperture through which an end of the head rail is received;
   a blade assembly comprising a blade housing and at least one blade for cutting the bottom rail and the blind slats;
   a drive mechanism operatively connected to the plate and the blade assembly, the drive mechanism causing the plate to rotate about a die axis and to cut the head rail, the drive mechanism further causing the blade assembly to move linearly to cut the bottom rail and the blind slats wherein the head rail, the bottom rail, and the blind slats are cut non-sequentially and at the same time.

15. The apparatus of claim 14 wherein the blade housing supports a first blade for cutting the bottom rail, and a second blade for cutting the plurality of blind slats.

16. The apparatus of claim 15 wherein the first blade is configured to cut a bottom rail having an open profile.

17. The apparatus of claim 16 wherein the first blade is configured to cut a bottom rail having a closed profile.

18. The apparatus of claim 14 wherein the drive mechanism is manually operated.

19. The apparatus of claim 14 further including an adjustable end guide adjacent to the body, whereby the end guide is configured to contact the head rail, bottom rail, and blind slats when a desired length of the head rail, the bottom rail, and the blind slats are extended through the body.

20. The apparatus of claim 19 wherein the end guide further comprises an end guide lock.

21. The apparatus of claim 20 wherein the end guide is operatively connected to the drive such that the end guide is movable to allow cut blind pieces to be removed.

22. The apparatus of claim 14 further comprising a support juxtaposed to the body, wherein the support includes at least one bracket configured to support at least the head rail, the bottom rail and the blind slats.

23. The apparatus of claim 14 further comprising a blind slats clamp.

24. The apparatus of claim 14 wherein the head rail aperture has a profile corresponding to a cross section of the head rail.

25. The apparatus of claim 24 wherein the head rail aperture further comprises tooth-like projections for piercing the head rail.

26. A cutting machine for a venetian blind comprising a head rail, a bottom rail, and a plurality of blind slats, the cutting machine comprising:
   a body defining a head rail opening, a bottom rail opening, and two blind slat openings;
   a plate for cutting the head rail, the plate defining a head rail aperture through which an end of the head rail is received, the head rail aperture having a profile corresponding to a cross section of the head rail, and including at least one tooth-like projection;
   a blade assembly comprising a blade housing, a first blade for cutting the bottom rail, and a second blade for cutting the blind slats;
   a manually controlled drive mechanism operatively connected to the plate and the blade assembly, the drive mechanism causing the plate to rotate about a die axis and cut the head rail, the drive mechanism further causing the blade assembly to move linearly to cut the bottom rail and the blind slats, wherein the head rail, the bottom rail, and the blind slats are cut non-sequentially and at the same time;

an adjustable end guide, whereby the end guide is configured to contact the head rail, bottom rail, and blind slats when a desired length of the head rail, the bottom rail, and the blind slats are passed through the body.

27. The apparatus of claim 26 wherein the end guide further comprises an end guide lock.

28. The apparatus of claim 26 wherein the end guide is operatively connected to the drive mechanism such that the drive mechanism moves the end guide to allow cut blind pieces to be removed.

29. The apparatus of claim 26 further comprising a support juxtaposed to the body, wherein the support includes at least one bracket configured to support at least the head rail, the bottom rail and the blind slats.

30. The apparatus of claim 26 further comprising a blind slats clamp.

31. The apparatus of claim 26 wherein the first blade is configured to cut a bottom rail having an open profile.

32. The apparatus of claim 26 wherein the first blade is configured to cut a bottom rail having a closed profile.

33. The apparatus of claim 26 wherein the first blade cuts the bottom rail along its long cross-sectional axis.

34. The apparatus of claim 26 wherein the first blade has a pointed shape.

35. The apparatus of claim 26 wherein the second blade has a shape substantially corresponding to the profile of the blind slats.

36. A method of cutting a venetian blind, having a head rail, a bottom rail, and a plurality of blind slats, said method comprising the steps of:
  inserting a first end of the head rail through a head rail opening in a body and through at least one head rail aperture in a die;
  inserting a first end of the bottom rail through a bottom rail opening in the body;
  inserting a first end of the plurality of blind slats through at least one blind slats opening in the body;
  causing a drive mechanism to move at least a portion of the die such that the head rail is cut by the rotational movement of at least a portion of the die;
  causing the drive mechanism to move a blade assembly linearly such that the bottom rail and plurality of blind slats are cut by the blade assembly;
  wherein cutting the head rail and cutting the bottom rail and plurality of blind slats is non-sequential and occurs at the same time.

37. The method of claim 36 further including the step of securing a portion of the plurality of blind slats with a blind slats clamp.

38. An apparatus for non-sequential cutting of a venetian blind comprising a head rail, a bottom rail, and a plurality of blind slats, the apparatus comprising:
  a body means for receiving through a head rail opening in the body means the head rail, the body means further receiving through a bottom rail opening in the body means the bottom rail, the body means further receiving through at least one blind slats opening the plurality of blind slats;
  a head rail cutter means for cutting the head rail;
  a bottom rail and blind slats cutter means for cutting the bottom rail and blind slats; and
  a drive means for moving the head rail cutter means and the bottom rail and blind slats cutter means at the same time wherein the head rail cutter means is moved rotationally and the bottom rail and blind slat cutter means is moved linearly.

39. The apparatus of claim 38 further comprising an end guide means for measuring the head rail, the bottom rail, and the blind slats to be cut.

40. The apparatus of claim 38 wherein the end guide means is movable in response to actuation of the drive means.

41. The apparatus of claim 39 further comprising a blind slats clamping means for securing the plurality of blind slats within the blind slats opening.

42. The apparatus of claim 38 further comprising a blind support means for holding at least portions of the head rail, the bottom rail and the blind slats.

43. The apparatus of claim 38 wherein the drive means is manually operated.

* * * * *